Sept. 27, 1955 C. A. ROBERSON 2,719,069

PHONOGRAPH RECORD FILE AND DISPENSER

Filed March 9, 1953 5 Sheets-Sheet 1

Charles A. Roberson
INVENTOR.

BY Clarence A. O'Brien
and Harvey B. Jacobson
Attorneys

Sept. 27, 1955 C. A. ROBERSON 2,719,069

PHONOGRAPH RECORD FILE AND DISPENSER

Filed March 9, 1953 5 Sheets-Sheet 2

Charles A. Roberson

INVENTOR.

BY Clarence A. O'Brien and Harvey B. Jacobson

Attorneys

Charles A. Roberson
INVENTOR.

BY Clarence A. O'Brien
and Harvey B. Jacobson
Attorneys

Sept. 27, 1955 C. A. ROBERSON 2,719,069

PHONOGRAPH RECORD FILE AND DISPENSER

Filed March 9, 1953 5 Sheets-Sheet 4

Charles A. Roberson
INVENTOR.

BY Clarence A. O'Brien
and Harvey B. Jacobson
Attorneys

PHONOGRAPH RECORD FILE AND DISPENSER

Filed March 9, 1953 5 Sheets-Sheet 5

Charles A. Roberson
INVENTOR.

BY Clarence A. O'Brien
and Harvey B. Jacobson
Attorneys 2,719,069

PHONOGRAPH RECORD FILE AND DISPENSER

Charles A. Roberson, Lynchburg, Va.

Application March 9, 1953, Serial No. 340,993

7 Claims. (Cl. 312—18)

This invention relates to a phonograph record file and dispenser and has for its primary object the provision of an apparatus capable of receiving and storing phonograph records and which is further capable of selectively discharging a particular record as may be desired.

A further object of this invention is to file and store phonograph records in a compact manner utilizing a rack having phonograph record separators of minimum width.

One of the particular features of the invention which enables separators of minimum thickness to be used is provided by the use of a pair of spaced guide plates which are capable of being vertically moved into embracing engagement with a selected record which is being lifted from the rack or which is being returned to the rack.

Another important feature of the invention resides in the use of a flexible wall for the apparatus which is entrained about suitable vertical support members and which is movable with the record selecting carriage so as to enable the wall to maintain the entire apparatus substantially free from dust or other foreign matter.

It is within the concept of this invention to utilize this apparatus simply as a file and dispenser for phonograph records, but it is further within the spirit of the invention to utilize this equipment within the usual phonograph record storage space in a radio and phonograph combination or in a three-way combination including television, radio and a phonograph. Further, many music stores, radio stations and other business establishments can utilize this device to provide a selected record in a convenient manner.

The construction of this invention features the use of a carriage slidably mounted on tracks which are attached to the base of the apparatus. The carriage is adapted to be moved into alignment by a suitable operating mechanism so as to enable a selected record to be lifted from the rack and discharged through vertically movable guide plates between two vertical members to which the flexible wall is terminally secured.

Still further objects of the invention reside in the provision of a phonograph record file and dispenser that is strong and durable, comparatively simple in construction and manufacture, highly attractive in appearance and easy to operate, capable of keeping phonograph records clean and safe, and which is relatively inexpensive to produce.

These, together with the various ancillary objects and features of the invention which will become apparent as the following description proceeds, are attained by this phonograph record file and dispenser, a preferred embodiment of which has been illustrated in the accompanying drawings, by way of example only, wherein.

Figure 10:
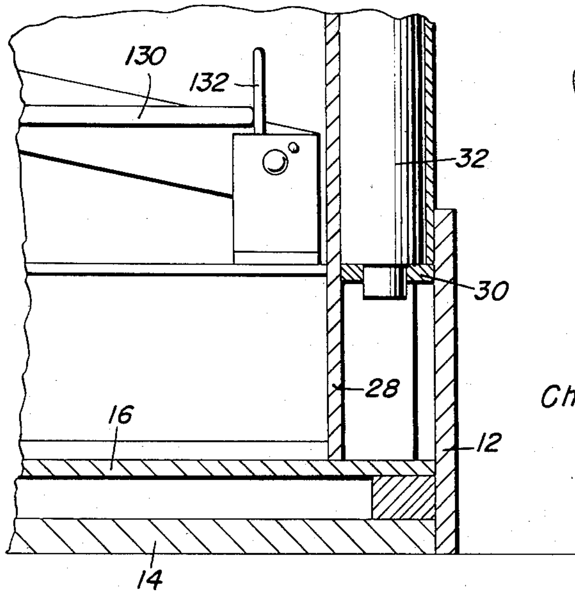
Figure 10 is a sectional detail view of the rollers on which the flexible wall is mounted as taken along the plane of line 10—10 in Figure 2.
Figure 11:
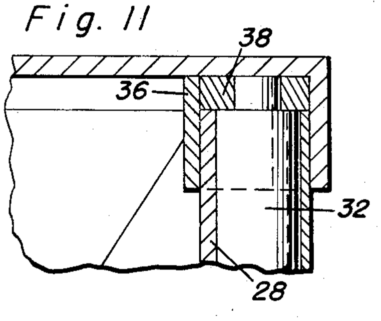
Figure 11 is a sectional detail view illustrating the manner in which the rollers on which the side walls are entrained are secured to the upper portions of the apparatus.
Figure 5:
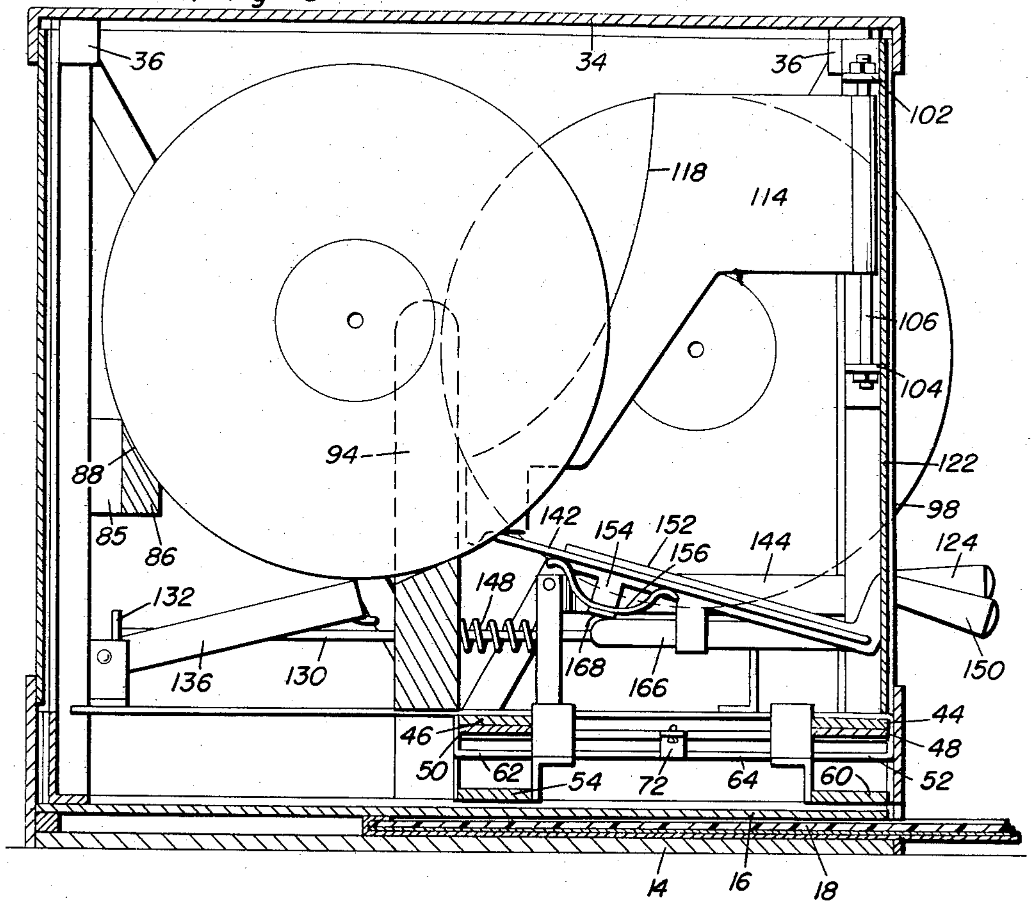
Figure 5 is a vertical sectional view as taken along the plane of line 5—5 in Figure 2 showing the means for replacing a record in the rack in an initial stage of actuation and with two records in different positions.
Figure 8:
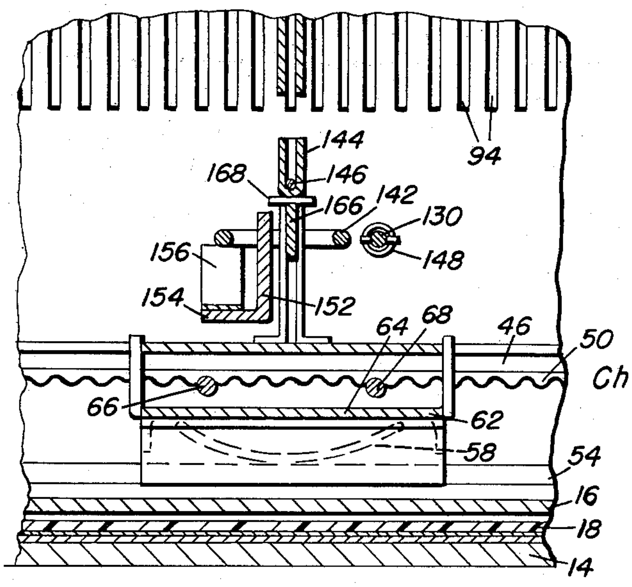
Figure 8 is a sectional detail view as taken along the plane of line 8—8 in Figure 2 and also showing the construction of the tracks.

With continuing reference to the accompanying drawings wherein like reference numerals designate similar parts throughout the various views, reference numeral 10 generally designates a phonograph record file and dispenser constructed in accordance with the concept and spirit of this invention. This apparatus includes a base 12 which is provided with upper and lower base plates 14 and 16 between which there is slidably received a drawer 18 having indicia 20 thereon providing an indication of the titles of the phonograph records which are filed in the apparatus 10. Extending upwardly from the base 12 are four vertical support members 22, 24, 26 and 28 positioned at the corners of the apparatus 10. Each of these vertical support members has bearing blocks 30, see Figure 10, secured thereto within which the lower ends of rollers 32 are journaled. A cover 34 is provided for the apparatus and in the corners thereof there are provided angle-shaped members 36, as shown in Figure 11, adapted to fit about the vertical support members and further adapted to retain within their confines bearing blocks 38 within which the upper ends of the rollers 32 are journaled. Abutting the vertical support members 24 and 26 and secured thereto is an angle-shaped track supporting member 40. A further track supporting member 42, angular in shape, is terminally secured to the vertical support members 22 and 28. Terminally secured to the track supporting members 40 and 42 and abutting the vertical support members 24 and 22 is a forward track element 44. A rear track element 46 is terminally secured to the track supporting members 40 and 42. The track elements 44 and 46 have depending therefrom corrugated plates 48 and 50 as can be seen in Figures 3, 4, 5, 6 and 8. Below the track elements 44 and 46 there are provided lower tracks 52 and 54. Resting on the lower tracks 52 and 54 are springs 56 and 58, Figures 7 and 8, which press upwardly against the upper plates 60 and 62 of spring housings which overlie the lower tracks 52 and 54 and which depend from the transverse plate 64 forming the base of a carriage. Extending between the vertical sides of the transverse plate 64 are rods 66 and 68, Figure 7, which are adapted to be engaged within the corrugations of the corrugated plates 48 and 50. It is noted that the corrugated plates 48 and 50 are aligned with each other. The transverse plate 64 has ears 70 and 72 to which there is terminally attached a draw line 74 entrained about a pair of drums 76 and 78, Figure 2, mounted on brackets carried by the base 12. The drum 78 is turned by means of a shaft 80 operated by a knurled knob 82 extending outwardly from the base 12. The draw line 74 is formed in two sections, one section being secured at its end to ear 72 and being entrained and secured about drum 78. The other section of draw line 74 is secured to ear 70, entrained about drum 76, and then secured to drum 78. Therefore, rotation of shaft 80 in either direction will move the carriage. Hence, upon rotation of the knob 82, the carriage will move along the tracks against the pressure exerted by the springs 56 and 58. The rods 66 and 68 will be retracted from the grooves of the corrugated plates 48 and 50 and into the next subsequent groove until an indicator pointer 84 carried by the transverse plate 64 is directed to a desired record indicated by the indicia 20.

Supported by means of brackets 85 which are secured to the vertical support members 26 and 28 is the rear longitudinal member 86 of a record rack. The rear longitudinal member 86 is provided with an arcuate surface 88 for support of a phonograph record disk in cooperation with a front longitudinal member 90 having a supporting surface 92 extending downwardly and rearwardly. A plurality of longitudinally spaced, very thin separator strips 94 extend vertically upwardly from the front longitudinal supporting member 90 which is supported by means of stands 96 at either end of the apparatus 10 and which extend upwardly from the track supporting members 40 and 42. In this manner, a considerable number of records may be stored in a vertical position.

Figure 2:
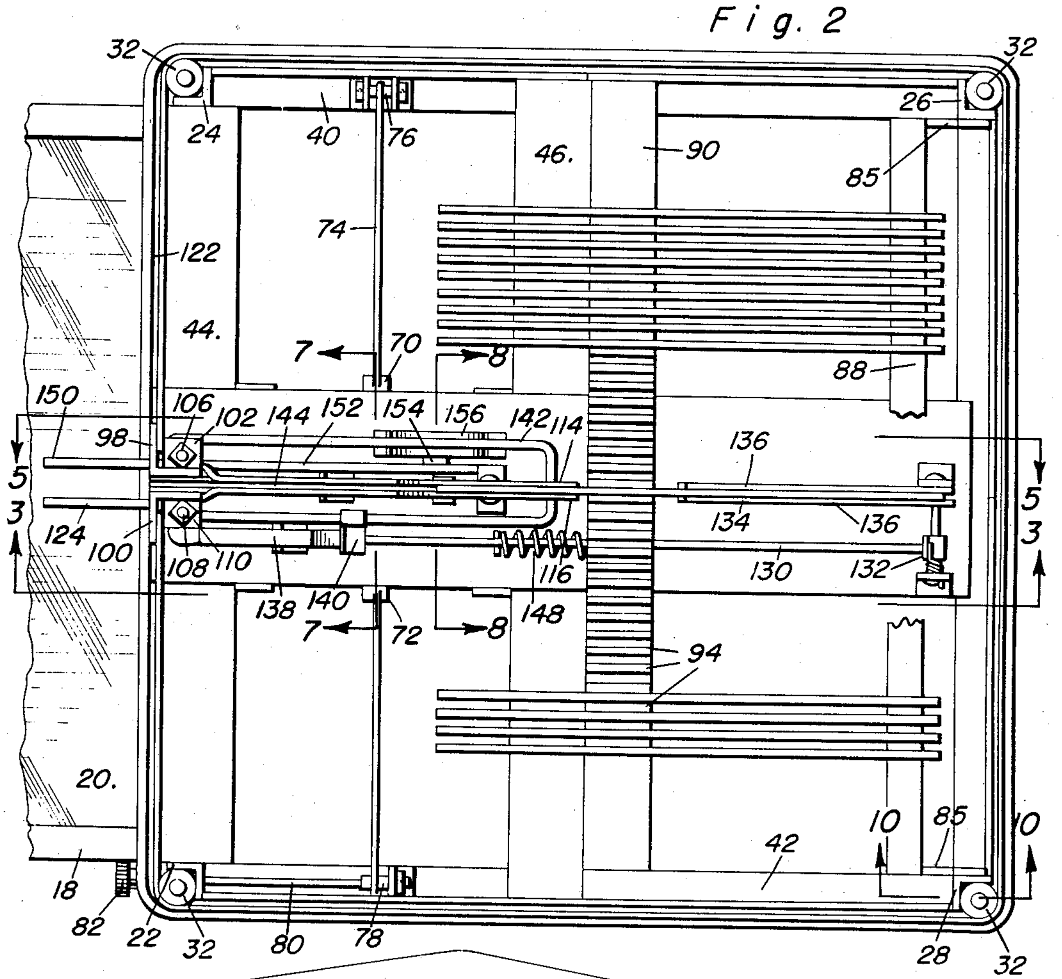
Figure 2 is a plan view of the phonograph record file and dispenser with the cover thereof removed.
Figure 1:
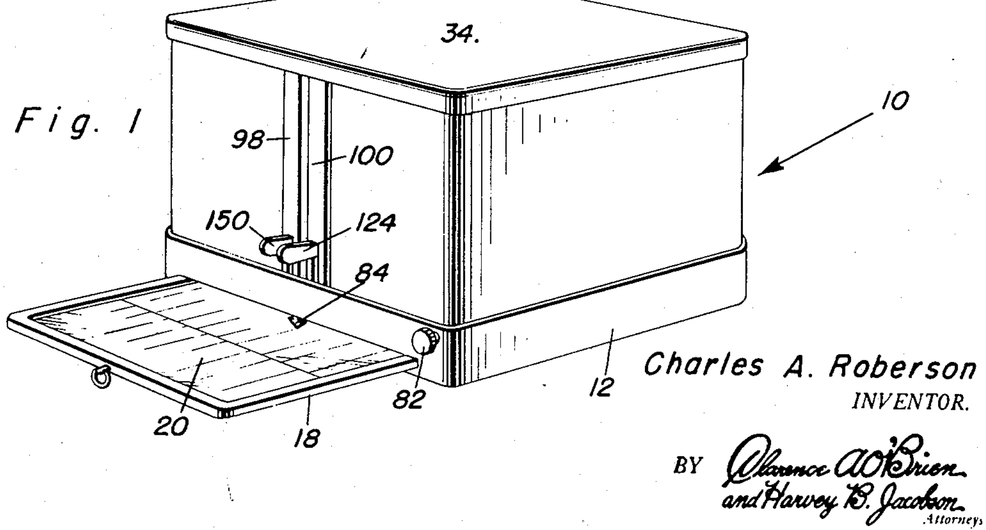
Figure 1 is a perspective view of an apparatus constructed in accordance with the concept of this invention adapted to be utilized in the storing of phonograph record disks.

Secured to the upper transverse plate 64 forming a part of the selector assembly carriage are a pair of angle-shaped vertical members 98 and 100 as seen in Figures 1 and 2. Welded or otherwise attached to the vertical member 98 are upper and lower plates 102 and 104 to which there is bolted or otherwise secured a guide rod 106. A guide rod 108 extends between and is secured to the upper and lower support plates 110 and 112 which in turn are secured to the vertical member 100. The guide rods 106 and 108 have vertically slidably mounted thereon a pair of guide plates 114 and 116. The guide plates 114 and 116 are each provided with an arcuate rear section 118 and 120, respectively, and are adapted to embrace a selected record therebetween.

Terminally secured to the vertical members 98 and 100 is a flexible wall 122 which is entrained about the rollers 32 and which is movable with the carriage when actuated by the knob 82.

Figures 3, 9:
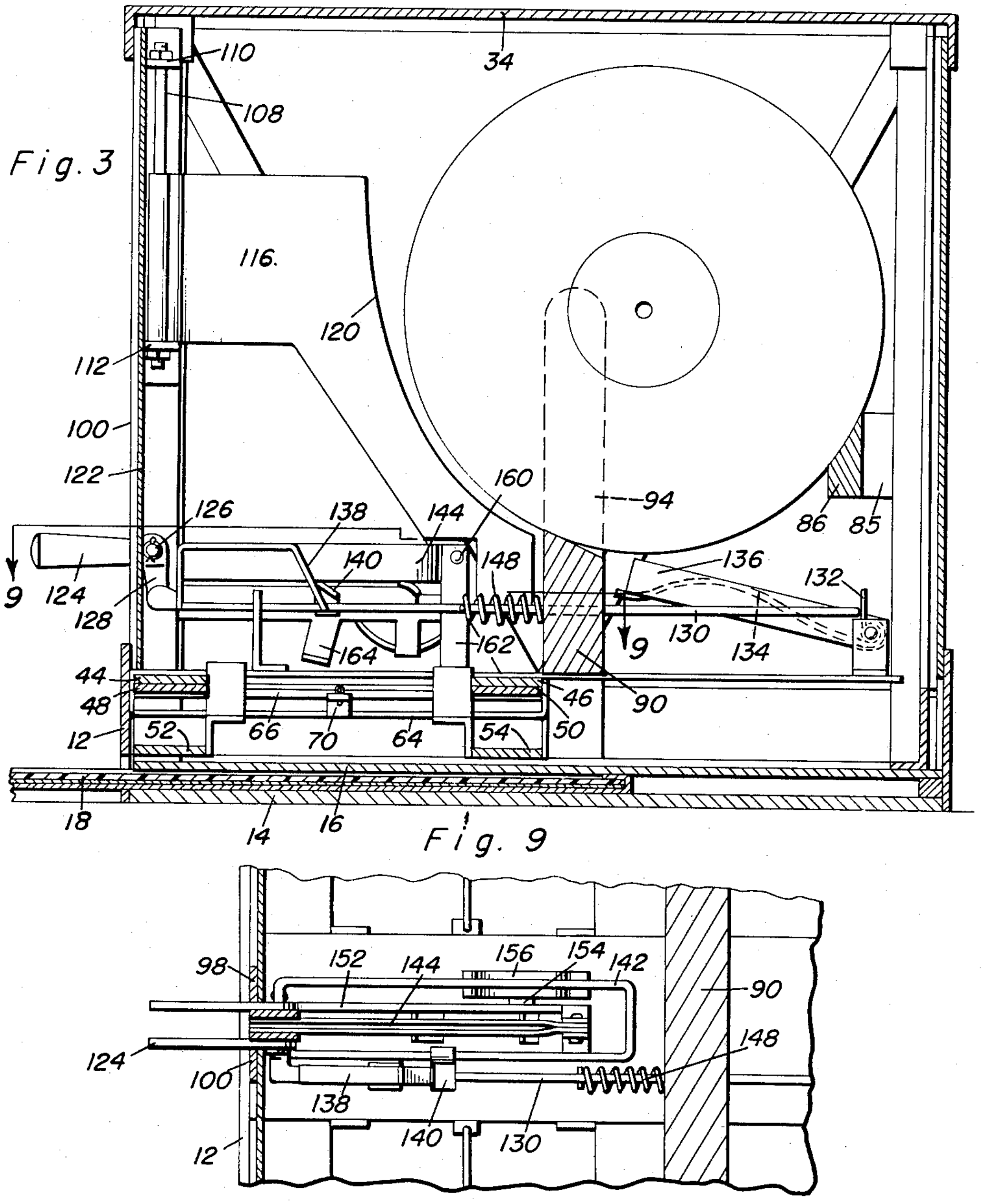
Figure 3 is a vertical sectional view as taken along the plane of line 3—3 in Figure 2 showing the apparatus in a normal position.
Figure 9 is a horizontal sectional view as taken along the plane of line 9—9 in Figure 3 showing in detail the construction of the pointer and cam actuated means for urging the spaced parallel guide plates.
Figure 4:
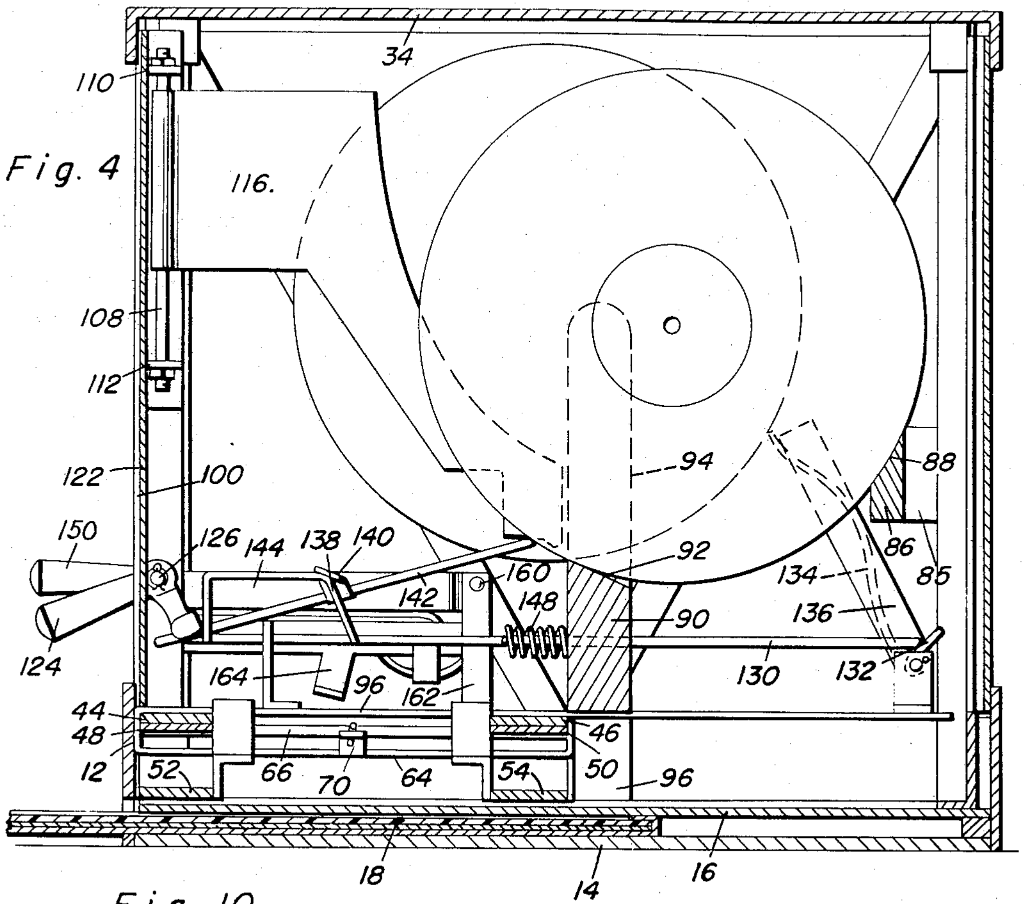
Figure 4 is a vertical sectional view similar to that of Figure 3 but showing the device with the record lifting means actuated and with two records in different positions.

In order to remove one of the records carried by the rack consisting of the longitudinal members 86 and 90, there is provided a right hand operating lever 124 which is pivotally mounted on a rod 126 extending between the vertical members 98 and 100 and therebeyond. The right hand operating lever includes a crank 128 which actuates a plunger 130, see Figure 3, which is adapted to engage a detent 132 of a lifting arm 134. The lifting arm 134 is arcuate in shape and normally underlies the records supported by the rack. The pair of spaced guides 136 are positioned on either side of the lifting arm 134 and are adapted to receive a record therebetween when the plunger actuates the lifting arm 134 to raise the lifting arm 134 from the position as is shown in Figure 3 to the position as is shown in Figure 4. This urges the selected record forwardly and upwardly over the rearwardly and downwardly slanted supporting surface 92 of the transverse member 90. At the same time as the plunger 130 is actuating the detent 132, a cam 138 mounted on the plunger 130 engages a lug 140 carried by a substantially U-shaped lift bar 142 which is pivotally mounted on the shaft or rod 126 extending between the vertical members 98 and 100. As can be best seen in Figure 2, the left bar 142 extends beneath the guide plates 114 and 116, and hence, upon the rearward action of the cam 138, the lug 140 and hence the lift bar 142 lifts the guide plates 114 and 116 upwardly from the position as is shown in Figure 3 to the position as is shown in Figure 4. The guide plates when so raised have their rear surfaces 118 effectively moved forward to receive the selected record therebetween and to guide it forwardly to the space between the vertical members 98 and 100 from whence it can be withdrawn. The bottom of the record is supported by a receptacle 144 positioned below the space between the guide plates 114 and 116. The receptacle 144 may be provided with a cushion of felt 146 in the interior thereof. A spring 148 coaxial with the plunger 130 is used to urge the plunger outwardly and out of engagement with the detent 132.

Figure 6:
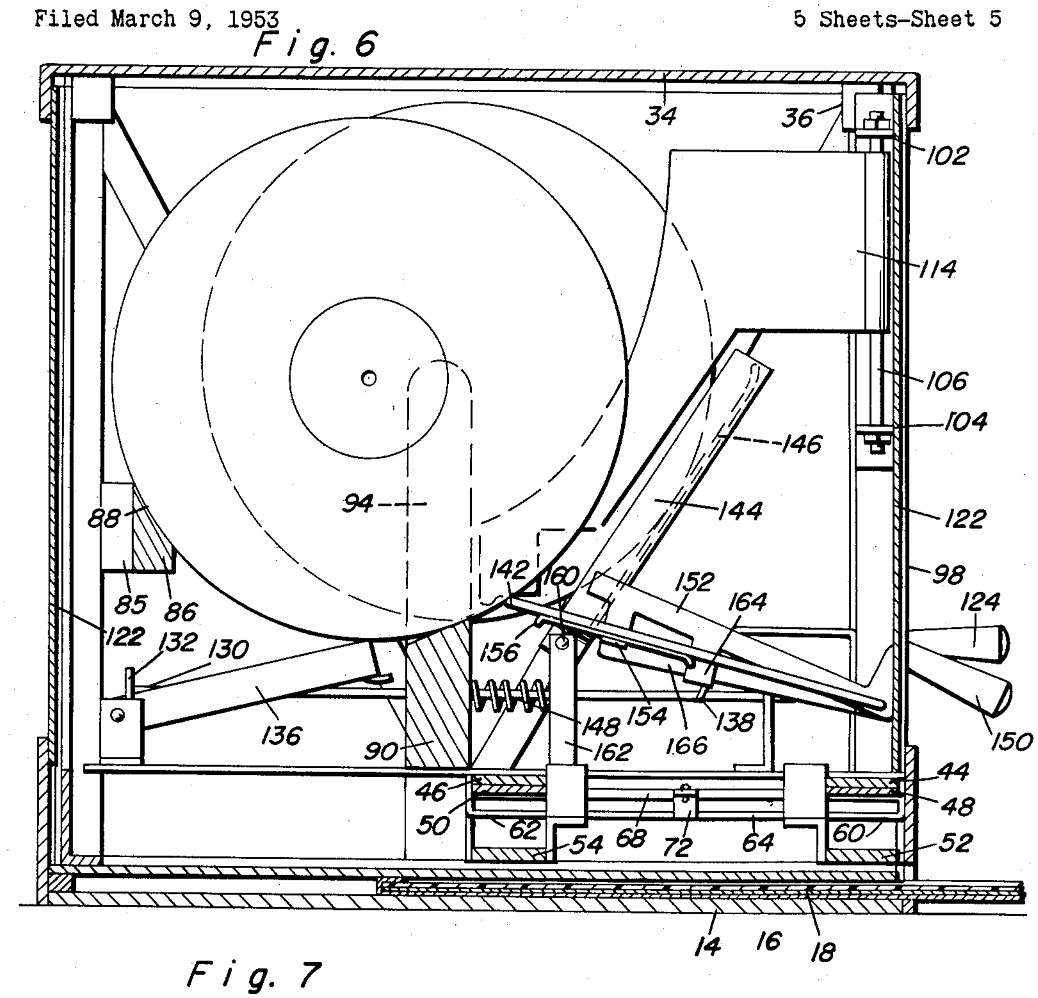
Figure 6 is a vertical sectional view taken along the same plane as Figure 5 but showing the record returning apparatus in a later stage during actuation and with two records in different positions.
Figure 7:
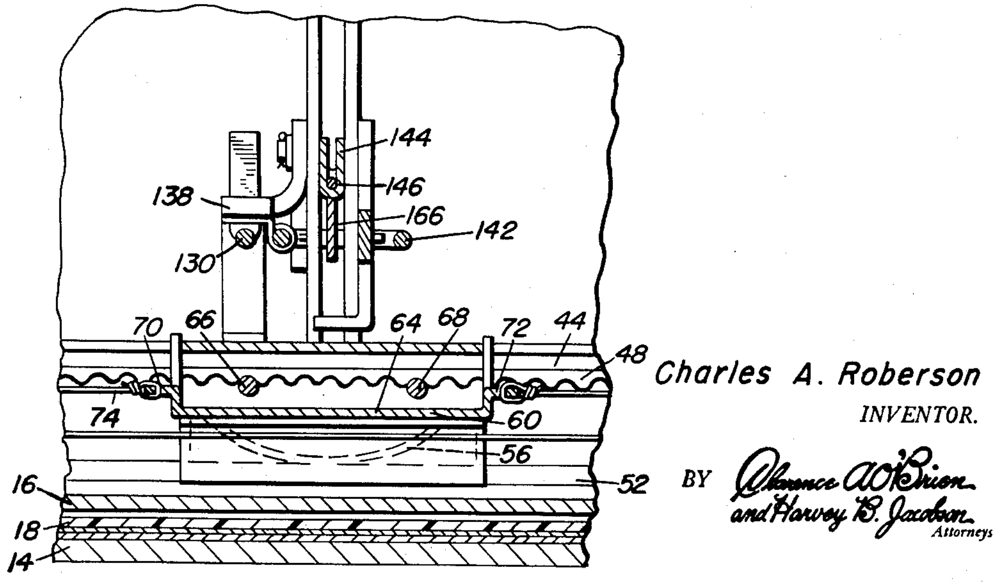
Figure 7 is a vertical sectional detail view as taken along the plane of line 7—7 in Figure 2 showing the construction of the tracks on which the carriage travels.

To return a record to the file, the pointer 84 is directed opposite the indicia of the space where it is desired to place the record. Then, the left hand actuating handle 150 is depressed. The left hand actuating handle 150 includes an operating lever 152 rigidly attached thereto. The handle 150 and the operating lever 152 are pivoted on the rod 126 as can be seen in Figure 4. The operating lever 152 has attached thereto a finger 154 which carries a spring 156 adapted to engage a portion of the U-shaped lifting rod 142. The receptacle 144 is pivotally mounted by means of a pin 160 to a stand 162 arising from the upper transverse plate of the carriage. When additional pressure is placed on the handle 150, the spring 156 will be flattened as is shown in Figure 6 and the flange 164 attached to the lever 152 will engage an auxiliary lever 166 having a fixed cam 168 at its rearmost end. The auxiliary lever 166 is pivotally mounted on the shaft 126 and is directly beneath and engages the receptacle 144, see Figure 7. Hence, upon this further depression of the handle 150, the cam surface will cause the receptacle 144 to pivot about the pin 160 upwardly to direct the selected record back into the rack, as is best shown in Figure 6. Gravity will return the receptacle 144 back to its normal or initial position, and if desired a spring (not shown) may be used to augment the force exerted by gravity on the receptacle 144.

In operation, to select a desired record, it is merely necessary to rotate the knob 82 to position the indicator 84 in alignment with the indicia designating the title of a particular record. Then, depressing the handle 124, the plunger 136 will cause the lifting arm 142 to raise the guides into alignment with the particular recess between the spacers 94 on either side of the selected record. Furthermore, the lifting arm 134 will be raised to urge the selected record into the space between the guide plates 114 and 116 and into the receptacle 144 from whence it may pass between the vertical members 98 and 100. To replace the record, it is merely necessary to depress the handle 150 which will operate the guide plates 114 and 116 and the receptacle 144 and carry the selected record back into its seat. It is to be noted that the flexible wall 122 will move with the indicator 84 and the vertical members 98 and 100 as the carriage is moved along the track, the tracks being aligned with the rack 94.

From the foregoing, the construction and operation of the device will be readily understood, and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A phonograph record file and dispenser comprising a framework including a base and a plurality of vertically extending support members, a rack for supporting a plurality of records carried by said base, a carriage for selecting and removing a selected record slidably mounted on said base, a pair of spaced vertical members forming a passageway for a record therebetween, said members being attached to said carriage, and a flexible wall entrained about said support members and terminally attached to said vertical members, said carriage including a record lifting mechanism for lifting the selected record from said rack, said vertical members having spaced guide plates vertically movably carried thereby, said guide plates being lifted into alignment with said selected record upon actuation of said record lifting mechanism.

2. A phonograph record file and dispenser comprising a framework including a base and a plurality of vertically extending support members, a rack for supporting a plurality of records carried by said base, a carriage for selecting and removing a selected record slidably mounted on said base, a pair of spaced vertical members forming a passageway for a record therebetween, said members being attached to said carriage, and a flexible wall entrained about said support members and terminally attached to said vertical members, said carriage including a record lifting mechanism for lifting the selected record from said rack, said record lifting mechanism including a plunger, a lifting arm pivotally mounted on said carriage below said rack, a detent extending from said arm, said plunger engaging said detent to pivot said arm, said vertical members having spaced guide plates vertically movably carried thereby, said guide plates being lifted into alignment with said selected record upon actuation of said record lifting mechanism.

3. A phonograph record file and dispenser comprising a framework including a base and a plurality of vertically extending support members, a rack for supporting a plurality of records carried by said base, a carriage for selecting and removing a selected record slidably mounted on said base, a pair of spaced vertical members forming a passageway for a record therebetween, said members being attached to said carriage, and a flexible wall entrained about said support members and terminally attached to said vertical members, said carriage including a record lifting mechanism for lifting the selected record from said rack, said record lifting mechanism including a plunger, a lifting arm pivotally mounted on said carriage below said rack, a detent extending from said arm, said plunger engaging said detent to pivot said arm, said vertical members having spaced guide plates vertically movably carried thereby, said guide plates being lifted into alignment with said selected record upon actuation of said record lifting mechanism, said plunger carrying a cam, said cam engaging a lug carried by a lift bar, said lift bar pivotally mounted on said carriage, said lift bar engaging said guide plates to raise said guide plates upon actuation of said plunger.

4. A phonograph record file and dispenser comprising a framework including a base and a plurality of vertically extending support members, a rack for supporting a plurality of records carried by said base, a carriage for selecting and removing a selected record slidably mounted on said base, a pair of spaced vertical members forming a passageway for a record therebetween, said members being attached to said carriage, and a flexible wall entrained about said support members and terminally attached to said vertical members, said carriage including a record lifting mechanism for lifting the selected record from said rack, said record lifting mechanism including a plunger, a lifting arm pivotally mounted on said carriage below said rack, a detent extending from said arm, said plunger engaging said detent to pivot said arm, said vertical members having spaced guide plates vertically movably carried thereby, said guide plates being lifted into alignment with said selected record upon actuation of said record lifting mechanism, said plunger carrying a cam, said cam engaging a lug carried by a lift bar, said lift bar pivotally mounted on said carriage, said lift bar engaging said guide plates to raise said guide plates upon actuation of said plunger, and a record replacing mechanism carried by said carriage for returning said selected record to said rack.

5. A phonograph record file and dispenser comprising a framework including a base and a plurality of vertically extending support members, a rack for supporting a plurality of records carried by said base, a carriage for selecting and removing a selected record slidably mounted on said base, a pair of spaced vertical members forming a passageway for a record therebetween, said members being attached to said carriage, and a flexible wall entrained about said support members and terminally attached to said vertical members, said carriage including a record lifting mechanism for lifting the selected record from said rack, said record lifting mechanism including a plunger, a lifting arm pivotally mounted on said carriage below said rack, a detent extending from said arm, said plunger engaging said detent to pivot said arm, said vertical members having spaced guide plates vertically movably carried thereby, said guide plates being lifted into alignment with said selected record upon actuation of said record lifting mechanism, said plunger carrying a cam, said cam engaging a lug carried by a lift bar, said lift bar pivotally mounted on said carriage, said lift bar engaging said guide plates to raise said guide plates upon actuation of said plunger, and a record replacing mechanism carried by said carriage for returning said selected record to said rack, said record replacing mechanism including a receptacle for a record, an operating lever pivotally mounted on said carriage, a spring carried by said operating lever engaging said lift bar to raise said guide plates, a leg engaging a crank pivotally carried by said carriage and secured to said receptacle to pivot said receptacle upwardly and inwardly upon actuation of said operating lever.

6. A phonograph record file and dispenser comprising a framework including a base and a plurality of vertically extending support members, a rack for supporting a plurality of records carried by said base, a carriage for selecting and removing a selected record slidably mounted on said base, a pair of spaced vertical members forming a passageway for a record therebetween, said members being attached to said carriage, and a flexible wall entrained about said support members and terminally attached to said vertical members, corrugated tracks carried by said base, at least one cylindrical track engaging member carried by said carriage, and means resiliently urging said track engaging member into engagement with said tracks to resiliently lockingly hold said carriage in a selected position, a selector pointer depending from said carriage, and means for moving said carriage to dispose said pointer in alignment with certain indicia denoting that said carriage is in alignment with said selected record, said record lifting mechanism including a plunger, a lifting arm pivotally mounted on said carriage below said rack, a detent extending from said arm, said plunger engaging said detent to pivot said arm.

7. A phonograph record file and dispenser comprising a framework including a base and a plurality of vertically extending support members, a rack for supporting a plurality of records carried by said base, a carriage for selecting and removing a selected record slidably mounted on said base, a pair of spaced vertical members forming a passageway for a record therebetween, said members being attached to said carriage, and a flexible wall entrained about said support members and terminally attached to said vertical members, corrugated tracks carried by said base, at least one cylindrical track engaging member carried by said carriage, and means resiliently urging said track engaging member into engagement with said tracks to resiliently lockingly hold said carriage in a selected position, a selector pointer depending from said carriage, and means for moving said carriage to dispose said pointer in alignment with certain indicia denoting that said carriage is in alignment with said selected record, said record lifting mechanism including a plunger, a lifting arm pivotally mounted on said carriage below said rack, a detent extending from said arm, said plunger engaging said detent to pivot said arm, said vertical members having spaced guide plates vertically movably carried thereby, said guide plates being lifted into alignment with said selected record upon actuation of said record lifting mechanism, and a record replacing mechanism carried by said carriage for returning said selected record to said rack.

References Cited in the file of this patent

UNITED STATES PATENTS

| | | |
|---|---|---|
| 1,289,961 | Thomas | Dec. 31, 1918 |
| 1,351,423 | Hutchison | Aug. 31, 1920 |
| 1,388,284 | Michaelson | Aug. 23, 1921 |

FOREIGN PATENTS

| | | |
|---|---|---|
| 392,058 | Great Britain | May 11, 1953 |